Feb. 27, 1934.  W. H. BLAIR  1,949,071
BRAKING OR ANTISKIDDING DEVICE FOR AUTOMOTIVE VEHICLES
Filed July 29, 1932  2 Sheets-Sheet 1

Inventor
William H. Blair
By
Wheeler, Wheeler and Wheeler
Attorneys

Feb. 27, 1934.  W. H. BLAIR  1,949,071
BRAKING OR ANTISKIDDING DEVICE FOR AUTOMOTIVE VEHICLES
Filed July 29, 1932  2 Sheets-Sheet 2
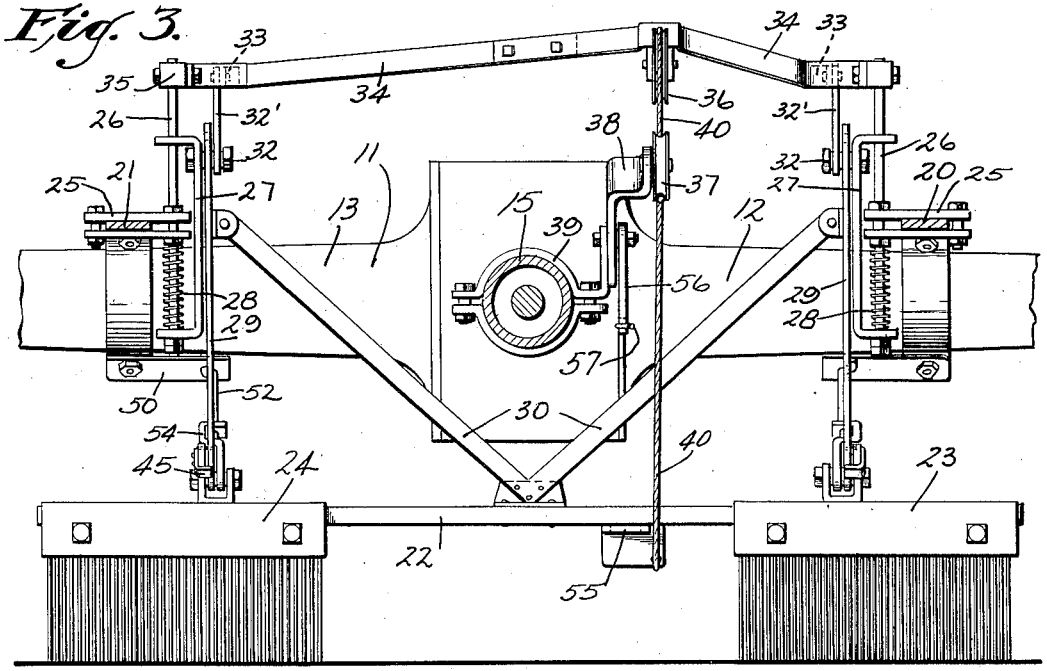
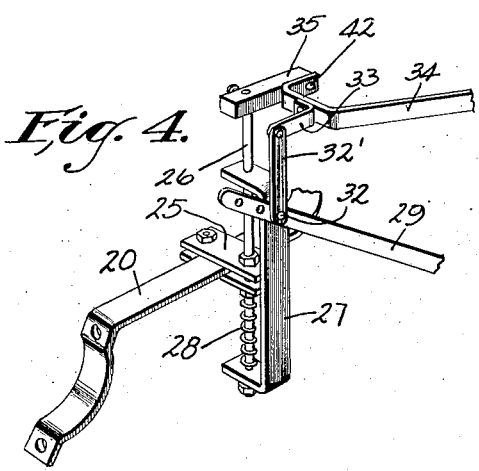
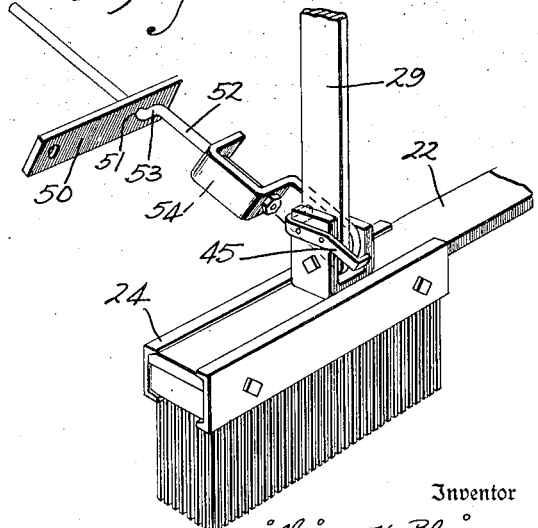
Inventor
William H. Blair
By
Wheeler, Wheeler and Wheeler
Attorneys Patented Feb. 27, 1934

1,949,071

UNITED STATES PATENT OFFICE 1,949,071

BRAKING OR ANTISKIDDING DEVICE FOR AUTOMOTIVE VEHICLES

William H. Blair, Janesville, Wis.

Application July 29, 1932. Serial No. 625,983

7 Claims. (Cl. 188—5)

My invention relates to an improvement in braking or anti-skidding devices for automotive vehicles.

The object of my invention is to provide a retractible shoe or scraper to be mounted upon the under carriage or chassis of an automotive vehicle and to be subject to control of an operator so that he may without the expenditure of much strength apply the road contacting shoe to its work.

Another object of my invention is to provide a framework for a road contacting shoe for the purpose described so that the operator of the vehicle may, without the expenditure of much effort, release the road contacting shoe from the pressure of the weight of the car and may then retract the road shoe to an elevation where it may be retained until the operation of the road shoe is again required. An important element of my invention is the provision of a framework incorporating elements which provide for easy retraction of the road shoe after the need for the use of that instrument has terminated.

In the drawings:

Figure 3 is a section on line 3—3 of Figure 2.

Figure 4 is a perspective of a portion of the special framework upon which I mount my road shoe.

Figure 5 is a perspective of my road shoe and a stop therefor.

Like parts are designated by the same reference characters throughout the several views.

Figure 1:
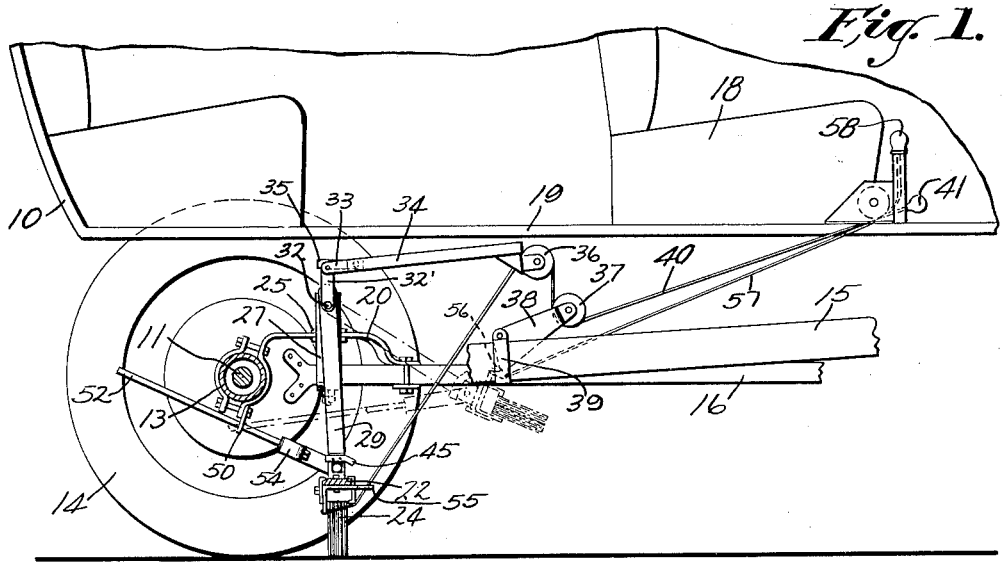
Figure 1 is a vertical section through the rear portion of the body and chassis of an automobile equipped with my invention.
Figure 2:
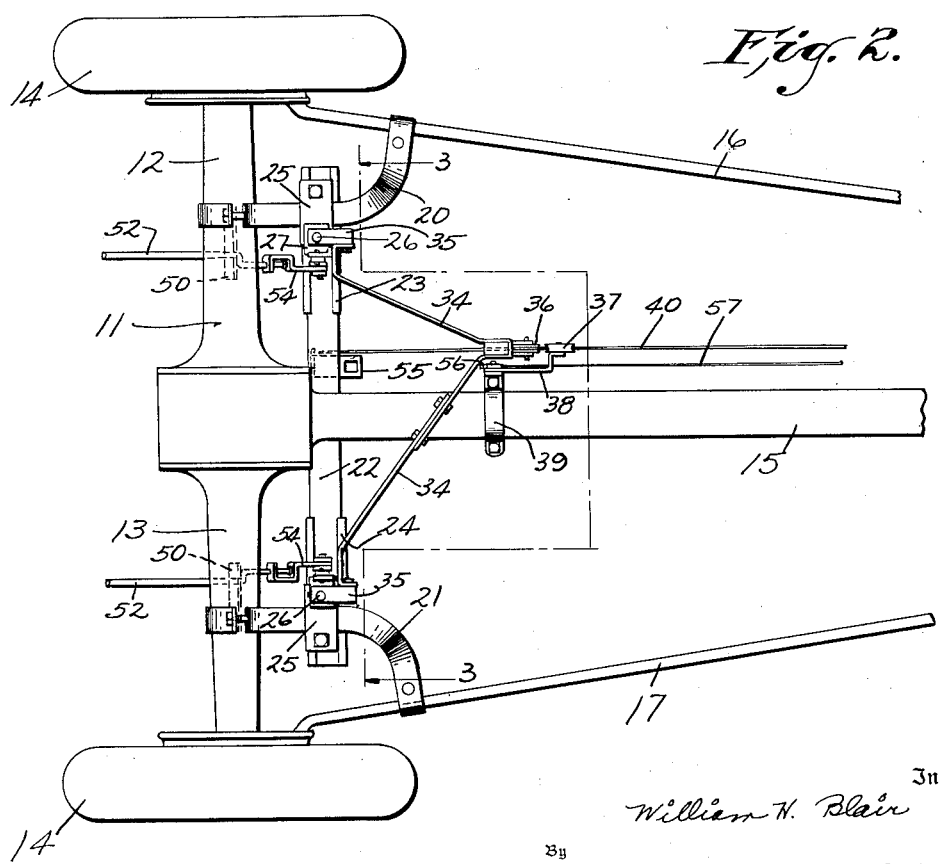
Figure 2 is a plan view of that portion of the chassis shown in Figure 1.

As shown in the drawings, my improved device is incorporated in an automotive vehicle provided with a body 10 mounted upon a chassis which includes a rear axle 11, including housing elements 12 and 13 respectively and wheels 14 at either end of the axle 11.

Extending forwardly from the axle 11 is a torque tube 15 which houses the usual conventional drive shaft. Radius rods 16 and 17 maintain the proper relationship of the axle 11 to the torque tube 15.

My invention is embodied in certain special equipment which is mounted upon and is supported by the parts thus far described, and my invention includes certain control devices which extend forwardly from the parts just described to a point adjacent an operator's seat 18 mounted upon the floor 19 of the body 10 of the automotive vehicle.

The structural elements embodied in my improved device are so constructed as to render them readily attachable to any automobile, and the main supporting elements comprise two clamp brackets 20 and 21, each of which is secured to the axle housing and to a radius rod.

Beneath the torque tube and beneath the radius rods I provide a cross member 22 to which I secure a number of road shoes 23—24. I am aware that there are many types of road contacting shoes used for the purposes herein described, but I have found upon experimentation that a road shoe provided with spikes or spines made of spring material coordinate with the other elements embodying my invention so as to work most satisfactorily when applied to the road surface.

Upon each of the bracket arms 21 and 20 I provide a saddle 25 through which, in a substantially perpendicular direction, I provide for a slide rod 26 upon which a U-shaped bracket 27 slidably "floats" under control of a spring 28. Between the floating bracket 27 and the cross bar 22 a pair of swinging struts 29, strengthened by braces 30, provide means for swinging the road shoes to and from operative position. Apertures near the upper end of the swinging struts 29 provide for selective adjustment of the swinging struts upon pin 32 which extends through the swinging strut into the floating bracket 27.

From this same pin 32 a retractor link 32' extends upwardly to a bracket 33 forming a part of the control frame 34. The control frame in turn is pivotally mounted upon a control frame arm 35 rigidly disposed upon the upper end of the slide rod 26.

At the forward end of the control frame 34 I provide a sheave or pulley 36. A second pulley 37 is mounted upon an arm 38 secured to a bracket 39 clamped to the torque tube 15. A control chain 40 extends from a control knob 41 around the pulley 37, over pulley 36, and downwardly to the cross arm 22 or to one of the road shoes.

Tension upon the chain 40 under the pull of an operator tends to pull the control frame 34 downwardly toward the pulley 37, thus pivotally rotating the control frame 34 about an axis comprising pin 42. The bracket 33 is then elevated and link 32' pulls up the floating bracket 27 against pressure of the spring 28.

The elevation of the floating bracket likewise elevates the swinging strut 29, and the road shoes are then relieved of pressure which theretofore, by reason of the weight of the car, has caused the road shoes to be pressed against the surface supporting the car.

It will be noted that the road shoe and the cross bar 22 are in pivotal connection with the swinging strut 29. Pivotal movement of the road shoes, however, is limited by a stop arm 45 which is shown clearly in Figure 5. This stop arm permits the road shoe to assume a perpendicular position when the car is moving forwardly. It likewise permits rotation of the road shoe to release it from the highway surface when the car is moved backwardly.

A stop plate 50 secured to the axle housing is apertured at 51 to receive a stop rod 52 which is provided with a curved portion 53 to prevent its unlimited passage through the aperture 51. The stop rod in turn is mounted rigidly in a stop bracket 54 which is in pivotal connection with the cross arm 22 and the road shoes 23 and 24. An apertured arm 55 connected to the cross arm 22 is so positioned as to engage with a pawl or dog secured to the clamp 39 on the torque tube. A separate chain or rod 57 connects the pawl 56 with a control rod 58 to permit the operator of the car to release the pawl from the bracket 55, thus permitting the road shoe to be dropped into operative relation with the highway.

The operation of my improved anti-skidding and brake device is as follows. Assuming that the swinging strut 29 and the road shoes with their cross bar 22 are in the dotted line position shown in Figure 1 the pawl 56 will be in engagement with the bracket 55 to prevent the road shoes from dropping into contact with the highway. Assuming that the car is traveling over a slippery surface and the operator wishes to brake the forward action of the car he may pull upon the control knob 58 and thus release the pawl 56 from its engagement with the bracket 55. The cross arm 22 and the road shoes 23 and 24 will then swing to operative position in which the swinging strut 29 will be substantially perpendicular. During this swinging movement of the swinging strut 29 the stop rod 52 will slide through the aperture 51 in plate 50 until the sharp curved portion 53 of the stop rod 52 comes in contact with the plate 50. The road shoes 23 and 24 will then be in contact with the road under pressure of the spring 28 since the swinging movement of the strut 29 will, by reason of the pressure of the weight of the car, elevate the floating bracket 27 to which the swinging struts are pivotally secured.

In this position of the struts 29 and the road shoes 23 and 24 forward or sideward movement of the car will be stopped.

When the action of the road shoes is no longer necessary the operator may place tension upon the control chain 40 by pulling upon the knob 41. The initial movement of the knob 41 will pull the forward portion of the control frame 34 downwardly, thus elevating the control bracket 33. Link 32' will then elevate the floating bracket 27 against spring pressure of the spring 28 and release the weight of the car from the road shoes.

Continued pull upon the control chain 40 will then, by reason of the connection of that chain with the road shoes and the cross arm 22, return the road shoe device generally to the position shown in dotted lines in Figure 1, so that the pawl 56 at that position may engage the cross arm and retain the road shoes and cross arm in retracted position until the use of the device is again necessary.

It will be noted that slide rod 26 is adjustable vertically with respect to the saddle 25. This provides for adjustment of spring 28 and also provides for adjustment to compensate for wear of the spikes forming the road contacting portion of the road shoe.

I claim:

1. The combination with an automotive vehicle and a chassis thereof provided with a floating bracket resiliently mounted therefrom, of a swinging strut mounted on the floating bracket, and a road shoe mounted on the strut.

2. The combination with an automotive vehicle and a chassis thereof provided with a floating bracket, of a swinging strut mounted on the floating bracket, and a road shoe mounted on the strut, said road shoe including spring spikes for contacting a road surface.

3. The combination with an automotive vehicle and a chassis thereof of a floating bracket resiliently mounted with respect to the chassis, a slide rod extending from the chassis adjacent the floating bracket, a control frame pivotally mounted on the slide rod, a swinging strut mounted upon the floating bracket and connections between the control frame and the swinging strut whereby to alter the position of the floating bracket and the strut.

4. The combination with an automotive vehicle and a chassis thereof of a swinging strut provided with a road shoe mounted with resilient connection to the chassis, whereby in the swinging movement of the strut to contact the road shoe with a road surface beneath the chassis with the weight of the automotive vehicle thereon, of a control device for swinging the strut and road shoe out of contact with the road surface, and a control frame comprising a lever for relieving the strut and shoe from the weight of the automotive vehicle in the initial swinging movement of the strut.

5. The combination with an automotive vehicle and a chassis thereof including an axle and radius rods and clamp bracket extending between the axle and the radius rod, a slide rod mounted rigidly with respect to the clamp bracket, a floating bracket upon the slide rod and provided with resilient means between the floating bracket and the clamp bracket, a swinging strut pivotally connected with the floating bracket and provided with a road shoe, a stop rod to permit movement of the strut from a forward position to a perpendicular position with the road shoe contacting the road with weight of the vehicle upon it, and a control frame mounted upon the slide rod and provided with linkage, whereby in the movement of the control frame, weight of the vehicle is removed from the road shoe.

6. The combination with an automotive vehicle and a chassis thereof including an axle and radius rods and clamp bracket extending between the axle and the radius rod, a slide rod mounted rigidly with respect to the clamp bracket, a floating bracket upon the slide rod and provided with resilient means between the floating bracket and the clamp bracket, a swinging strut pivotally connected with the floating bracket and provided with a road shoe, a stop rod to permit movement of the strut from a forward position to a perpendicular positon with the road shoe contacting the road with weight of the vehicle upon it, and a control frame mounted upon the slide rod and provided with linkage connected with the floating bracket, whereby in the movement of the control frame, weight of the vehicle is removed from the road shoe.

7. The combination with a vehicle chassis, of a frame provided with a pulley and mounted on a transverse axis therefrom, a strut mounted adjacent one end of the frame, and an actuating member comprising a flexible member passing over the pulley at the other end of the frame and extending to a member connected to the strut, whereby in the movement of the actuating member, the frame will be tilted on said axis to alter the height of the strut mounting.

WILLIAM H. BLAIR.